March 3, 1970  J. I. KOUGEL  3,498,158
STEEL EMBOSSING DIE AND METHODS OF MAKING THE SAME
Filed June 7, 1968

INVENTOR
Jack I. Kougel
his attorneys

United States Patent Office 3,498,158
Patented Mar. 3, 1970

3,498,158
STEEL EMBOSSING DIE AND METHODS
OF MAKING THE SAME
Jack I. Kougel, Leesburg, Ind., assignor to GTI Corporation, a corporation of Rhode Island
Filed June 7, 1968, Ser. No. 735,428
Int. Cl. B21k 5/20; B23k 9/00
U.S. Cl. 76—107                                    3 Claims

ABSTRACT OF THE DISCLOSURE

A method of making a steel embossing die is provided including the steps of hardening a suitable blank and cutting a series of successive impressions by electrical discharge machining to produce a final steel die having sharp, hardened cutting edges.

---

This invention relates to steel embossing dies and methods of manufacturing the same and particularly to a steel embossing die for metal circuit cutting and the like.

In the manufacture of cut metal circuits and similar operations on strip and foil materials it has been the practice to machine a steel die with ordinary machining techniques from an annealed steel blank and then to harden and draw the machined blank to the desired final hardness value. This practice has had many drawbacks which have made the practice expensive and not entirely satisfactory. One of the drawbacks has been the difficulty in maintaining the die in the flat condition during the hardening and drawing operation. Many dies are deformed to such an extent that great difficulty is experienced in their use. Another drawback has been the difficulty in maintaining the cutting edges to the desired degree of sharpness and on a uniform plane.

I have discovered an embossing die and method of making such dies which eliminates these problems and makes it possible to produce not only a perfectly flat die but also a die whose cutting edges are far superior in sharpness and hardness to those heretofore available.

Preferably I form a die blank to the desired shape and size, harden the same and draw it to the desired hardness level. I then cut the die by electrical discharge machining using a graphite cutting die or electrode having grooves corresponding to the desired cutting edges of the die and ribs coresponding to the grooves desired to be cut in the die, said grooves being wider than the desired cutting edges and flat bottomed to produce a first edge which is flat on top and wider than the final edge, a second graphite cutting die is then substituted for the first die, said second die being cut to the exact dimensions desired in the final steel die and the steel again subject to electrical discharge machining and finally a third graphite die identical with the second die is substituted for the second die and the steel die subject to a final electrical discharge machining at the finest finish cut possible which is stopped as soon as all radius is removed from the cutting edge, leaving the edge sharp. Preferably the first graphite die is used at high power rate, the second at a reduced power rate equivalent to a normal finish electrical discharge cutting rate and the third at the finest possible finish cut rate.

In the foregoing general description I have set out certain objects, advantages and purposes of my invention. Other objects, purposes and advantages of this invention will be apparent from a consideration of the following description and the accompanying drawings in which.

Figure 1:
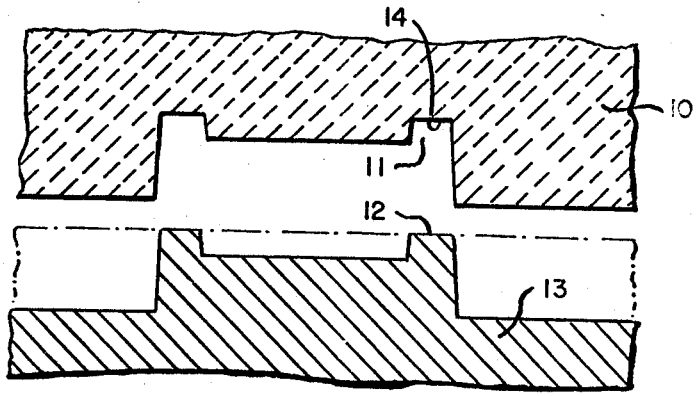
FIGURE 1 is a section through a first graphite die and steel die as cut by said first graphite die.
Figure 2:
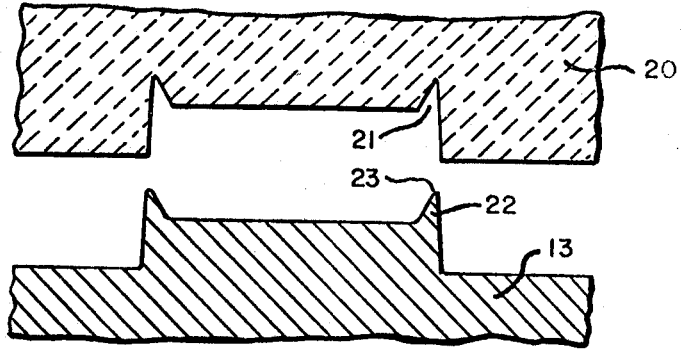
FIGURE 2 is a section through a second graphite die and steel die as cut by said graphite die.
Figure 3:
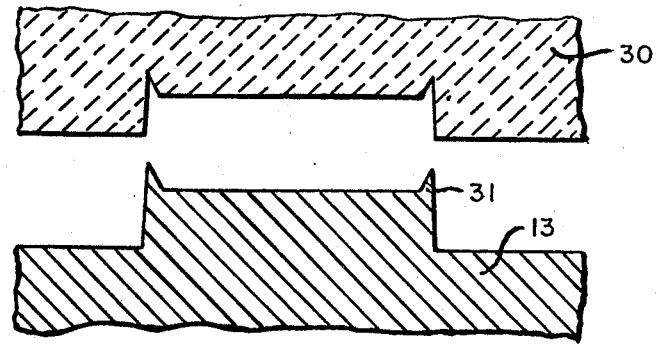
FIGURE 3 is a section through a third graphite die and steel die as cut by said third graphite die.

Referring to the drawings I have illustrated a first graphite die 10 having groves 11 corresponding to the ridges 12 desired to be produced in the first cut steel die 13. Each of the grooves 11 is flat bottomed as shown at 14 and slightly deeper than the final cutting edge desired. The second graphite die 20 has grooves 21 which are sharp at their bottom coresponding generally to the ridges 22 to be produced in a second cut of the steel die. The ridges 22 have a slight radius 23 at their top. This is not desirable. The third graphite die 30 is identical with die 20 and is used to produce a final sharpening of the ridges 31 to form cutting edges.

The operation of making the embossing die according to my invention is as follows. A steel die blank (outlined in chain line in FIGURE 1) is hardened, ground to shape and size and placed in an electrical discharge machining apparatus. A first graphite die 10 is placed over the surface to be cut and the machining is done at a high power rate in the usual manner for electrical discharge machining. The use of a high power rate saves time and electrode wear. The first graphite die 10 is replaced with second graphite die 20, which may be simply the first die 10 remachined. The machining is started again avoiding heavy amperage which could destroy the small areas which are likely to be first contacted. Machining is carried forward until the electrode seats completely. This should be done with reduced cutting power and at a finish rate. The steel die will appear to be completed but close inspection will show a radius at the inside of the cutting edge or rib. A third graphite die or electrode 30 is substituted for die 20. This again may be simply the second graphite die 20 remachined. A final cut is made using die 30 and the finest finish cut possible on the electrical discharge machining apparatus. Cutting should be stopped as soon as the cutting edges or ribs 31 are sharpened and the radius from the second cut removed.

I have found that, in addition to making a superior embossing die with materially reduced losses, my invention appears to cause an increased carbon concentration in the cutting edges and an increased hardness, resembling a case hardening effect, perhaps as a plating from the electrode.

While I have illustrated and described certain preferred embodiments and practices of my invention in the foregoing specification, it will be understood that this invention may be otherwise embodied within the scope of the following claims.

I claim:
1. A method of making steel embossing die and the like comprising the steps of:
   (a) forming a steel die blank of the desired shape and size,
   (b) hardening and drawing said blank to a desired final hardness level,
   (c) cutting a first embossing impression in said blank by electrical discharge machining using a graphite cutting electrode having a configuration precisely opposite that desired in the blank, said first impression having embossing ribs slightly higher and broader than those desired in the finished die and having flattened top surfaces,
   (d) cutting a second embossing impression in said blank superimposed on the first impression by electrical discharge machining using a graphite cutting electrode having a configuration precisely opposite that desired in the finished steel die.
   (e) cutting a third embossing impression in said blank superimposed on the second impression by electrical discharge machining using a graphite electrode having a configuration precisely opposite that desired in the finished steel die, said cut being made under the finest finish cut conditions possible with the electrical discharge machining apparatus.

2. A method as claimed in claim 1 wherein the step (c) is carried out at a high power rate.

3. A method as claimed in claim 2 wherein step (d) is carried out by beginning the cut at a low cutting power, increasing the power intermediate the cut and reducing the power to finish the cut.

References Cited

UNITED STATES PATENTS 2,813,966   11/1957   Matulaitis _____ 219—69

BERNARD STICKNEY, Primary Examiner

U.S. Cl. X.R.

219—69